United States Patent

[11] 3,572,735

| [72] | Inventor | Eldon O. Dryer<br>Malibu, Calif. |
|---|---|---|
| [21] | Appl. No. | 871,719 |
| [22] | Filed | Nov. 17, 1969 |
| [45] | Patented | Mar. 30, 1971 |
| [73] | Assignee | North American Rockwell Corporation<br>Continuation of application Ser. No.<br>571,886, Aug. 11, 1966, now abandoned. |

[54] CAPTIVE PLASTIC SEAL
12 Claims, 13 Drawing Figs.

[52] U.S. Cl.......................................................... 277/235,
251/332
[51] Int. Cl........................................................ F16j 15/06
[50] Field of Search............................................ 277/180,
182, 188, 206, 235; 285/336, 349, 363, 368

[56] References Cited
UNITED STATES PATENTS

| 2,647,732 | 8/1953 | Jarman.......................... | 259/4 |
| 2,733,969 | 2/1956 | Polk.............................. | 277/188 |
| 2,964,343 | 12/1960 | Klingler....................... | 277/144 |
| 3,248,119 | 4/1966 | Smith et al................... | 277/22 |
| 3,357,693 | 12/1967 | Perry............................ | 267/1.5 |

FOREIGN PATENTS

| 1,279,545 | 11/1961 | France |
| 1,377,659 | 9/1964 | France |
| 565,010 | 3/1931 | Germany |
| 805,365 | 12/1958 | Great Britain |
| 952,478 | 3/1964 | Great Britain |

*Primary Examiner*—Laverne D. Geiger
*Assistant Examiner*—Robert I. Smith
*Attorneys*—William R. Lane and Thomas S. MacDonald

ABSTRACT: A seal in which a viscoelastic mass is contained by a means in a confined volume so that a peripheral surface of the mass is exposed for sealing and wherein, in operation, a means exerts a deforming pressure on the mass to provide intimate sealing with a surface to be sealed.

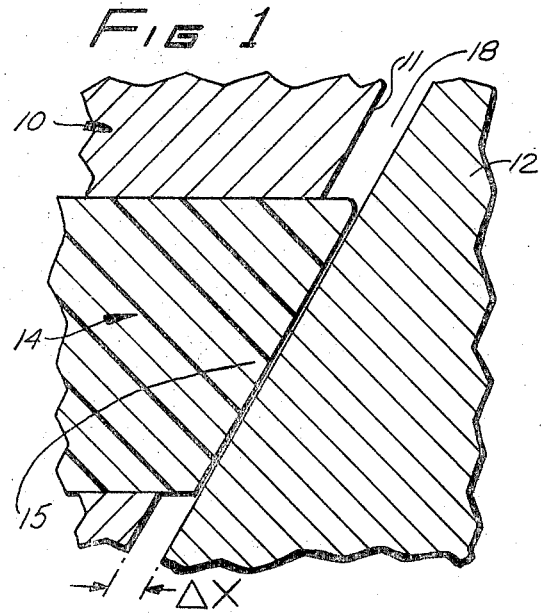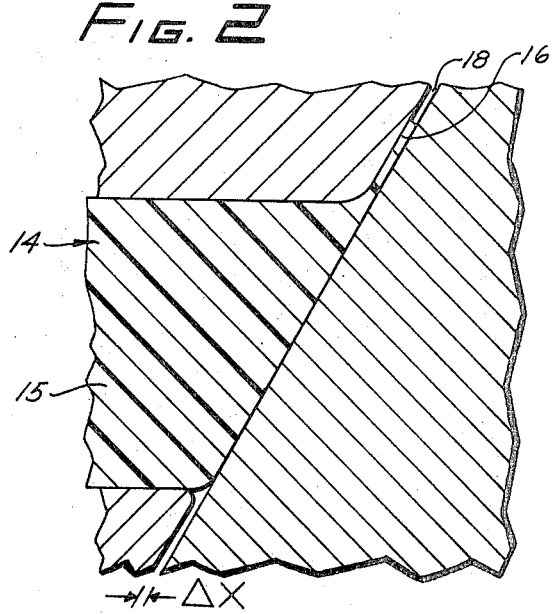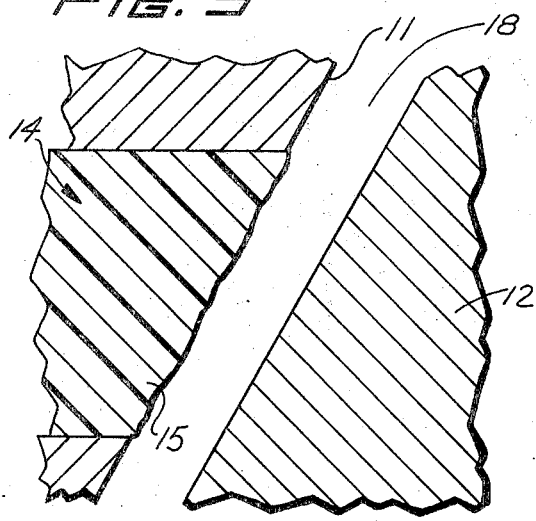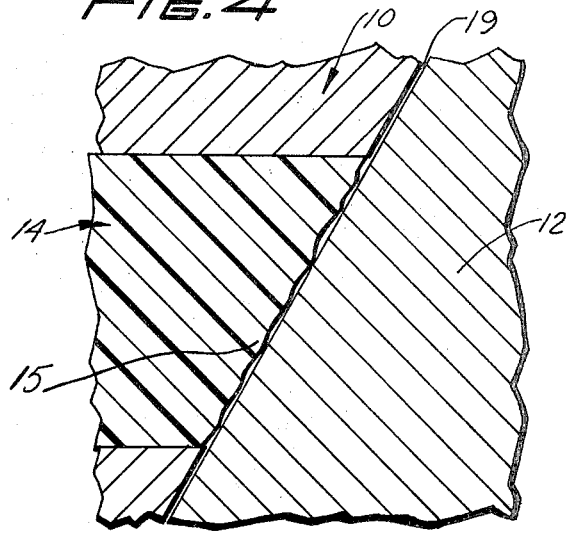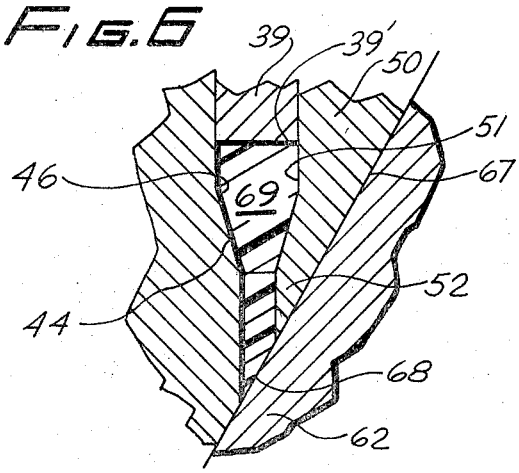

INVENTOR.
ELDON O. DRYER
BY Thomas S. MacDonald
ATTORNEY

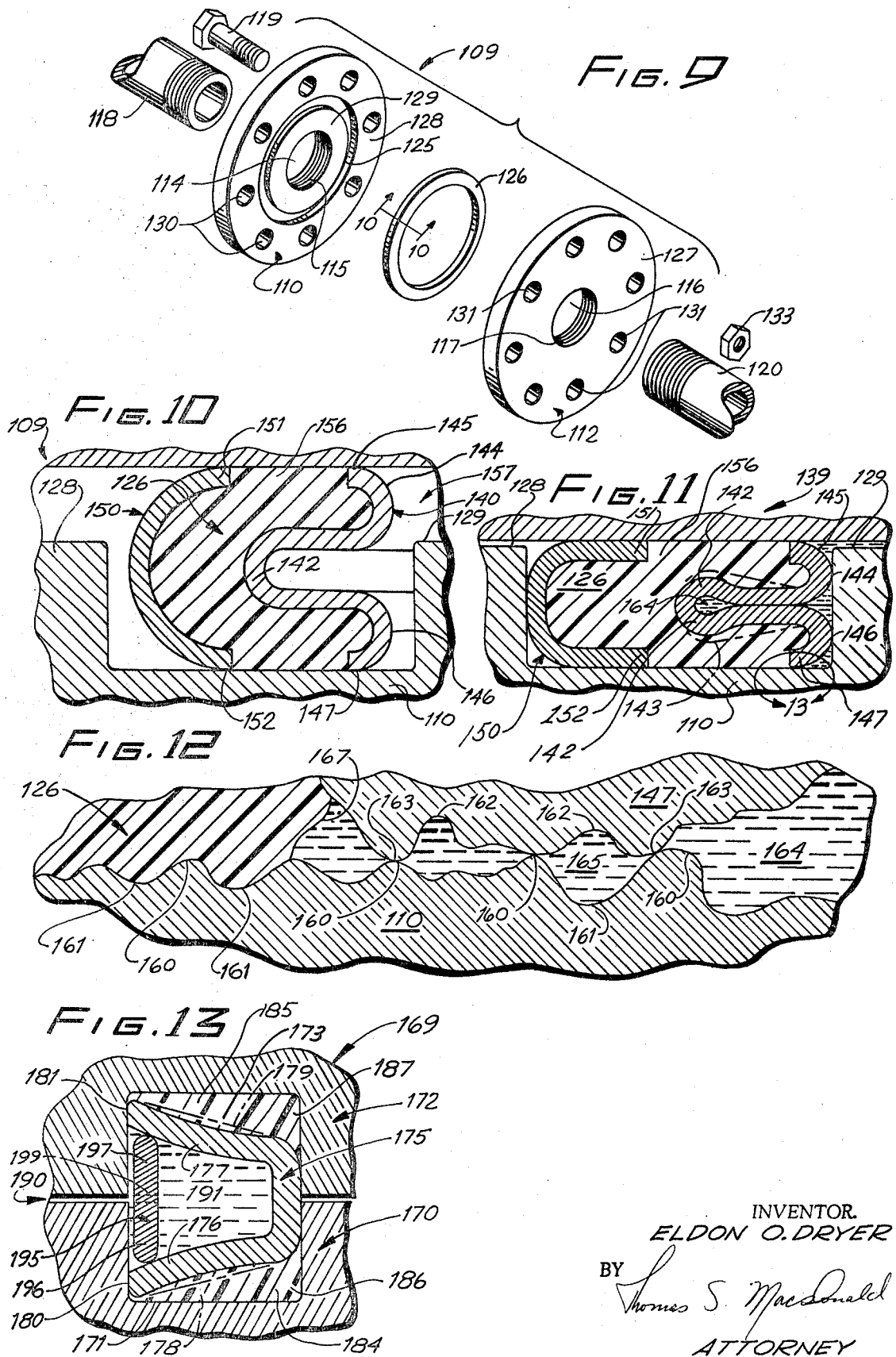

3,572,735

1

CAPTIVE PLASTIC SEAL

CROSS-REFERENCE TO RELATED APPLICATION

This application is a continuation of Ser. No. 571,886, filed Aug. 11, 1966 and now abandoned.

This invention relates to seals and more particularly to seal structure for making a plastic seal leakproof when used either at constant temperature or over a wide temperature range. The invention described herein was made in the performance of work under a NASA contract and is subject to the provisions of the National Aeronautics and Space Act of 1958, Public Law 85–568 (72 Stat. 426; 42 USC 2451), as amended.

A zero leakage seal is characterized by an absence of passageways through which fluid can escape, either outwardly of or downstream from the seal structure. While it is difficult to construct a leakproof seal for use in a constant pressure and temperature environment, there appear to be no reliable prior art seals capable of being leakproof over a wide temperature range. When hard metal surfaces are brought into face-to-face contact for sealing purposes, it is very difficult, if not impossible, to achieve the desired uniform zero clearance between the surfaces as is critical in achieving a fluidtight seal. Inherently, metal surfaces to some degree, are irregular and rough as characterized by cracks, crevices, voids and the like. This is true, notwithstanding the fact that they may have been subjected to polishing treatments aimed at eliminating the surface irregularities and rough spots. In addition, polishing techniques for smoothing metal surfaces are very expensive.

In the past, use has been made of soft, ductile metal such as gold, silver and copper as sealant material between relatively rough metal surfaces. The use of these specified materials and the like to produce fluidtight seals has proven to be unreliable due to the fact that these materials are prone to work hardening. This condition automatically limits reliability, shortens the life span of the seal and diminishes the number of times that the seal can be efficiently reused. Often such metal material can be used only once depending on the severity of the environmental conditions. In addition these metals have a very low plasticity, as compared to fluoroplastics for example, and therefore require much higher pressures for sealing.

For the foregoing, as well as other reasons, attempts have been made to construct seals from plastic material rather than metal. Fluoroplastics such as Teflon and Kel-F (a tetrafluoroethylene polymer and a trifluorochloroethylene polymer, respectively) have been used because they possess the desirable property of remaining adequately ductile at cryogenic temperatures as low as −430° F. Due to this property, the plastics can be forced to intimately conform with macroscopic voids in rough metal surfaces and therefore are quite suitable as sealants in cryogenic environments as well as in high heat environments up to +500° F. However, these plastics also possess adverse sealing properties. They lack resiliency and springback and experience property differences over extreme temperature ranges. In addition they are prone to experience excessive flow and creep under sustained loads, especially at room and higher temperatures. Unfortunately the same properties, namely, plasticity and ductility, which permit the plastic seal to closely conform with the surface irregularities also are responsible for causing adverse effects. These effects are that the pressurized plastic unpreventably bulges and extrudes. These extrusions, due to the nature of the plastic, are incapable of springing back so that the original seal configuration cannot be restored. Under nonsealing or pressure relaxation conditions the extrusions will gradually erode or be torn away with the result that the seal becomes ruptured and prone to leakage. The instant invention seeks to eliminate the foregoing deficiencies in prior art plastic seals.

An object of this invention is to provide a plastic seal capable of remaining leakproof at a constant temperature, as well as over a wide temperature range.

Another object of this invention is to provide essentially a zero leakage viscoelastic seal capable of being reused numerous times without impairment to its integrity.

2

Another object of this invention is to provide a process for applying force to a captivated seal in a manner so as to make it leakproof.

These, as well as other objects will be fully understood by studying the detailed written description of the instant invention with reference being made to the detailed drawings in which:

FIGS. 1 through 4 are a sequence of sectional views of a typical prior art plastic seal showing how its sealing capacity becomes gradually destroyed;

FIG. 6 is an enlarged view of a portion of the valve structure encircled within line 6 of the FIG. 5;

FIG. 9 is an exploded and partially schematically represented view of a captive viscoelastic seal incorporated in a static seal;

FIG. 10 is a cross-sectional detailed view of a captive viscoelastic seal incorporated in a static seal structure wherein pressure on the seal is relaxed;

FIG. 11 shows the seal of FIG. 10 as it is fully pressurized for sealing action;

FIG. 12 is an enlarged exaggerated view of the juncture encircled by line 12 in FIG. 11, the structure of the juncture being shown during zero leakage conditions; and FIG. 13 is a cross-sectional view of an alternative static seal embodiment.

Figure 5:
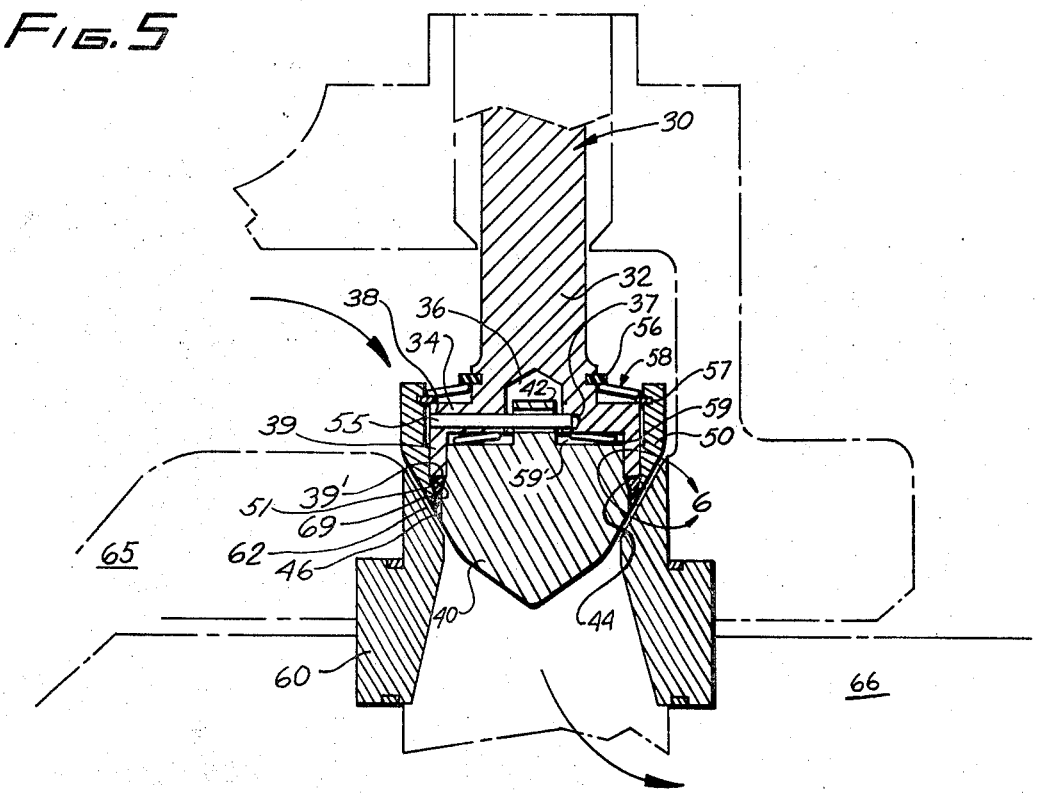
FIG. 5 is a cross-sectional view showing the captive plastic seal of this invention incorporated in a poppet valve structure.

Briefly described, the seal construction of the instant invention, in achieving its objects and advantages, includes a plastic seal which during sealing action is captivated by and completely fills a cavity in a housing portion of a seal structure. When being used, a force is directly exerted on the plastic seal causing it to deform and become viscous in which condition the material termed "viscoelastic" can be readily squeezed into rough surface voids of the sealing surface. The sealing surface can be a part of a throttling valve or shut valve seat or a component of a static seal, pipe coupling or the like. Under sufficient pressure the viscoelastic material intimately conforms with the surface voids of the sealing surface to block all potential passageways through which fluid would tend to leak. At higher temperatures the pressure required to achieve the fluidtight seal is considerably less than the pressure required to maintain fluidtight conditions in cryogenic environments. During sealing action the viscoelastic material, which acts as a viscous liquid, is restrained from bulging or extruding due to the fact that it is captivated in a chamber, the chamber being defined by one or more sealing surfaces and a housing portion of the seal structure. When sealing action or pressure is relaxed, the material loses its viscosity and remains a unitary solid mass so that portions of it cannot become separated. The pressure on the elastomer required to attain essentially zero leakage is primarily a function of the plastic used, the temperature environment, the fluid line pressure, and the depth of the voids in the sealing surface which just be filled.

In another aspect the instant invention provides a process for making a viscoelastic seal leakproof by first bringing chamber forming components into metal to metal contact and then applying a direct force on the seal, forcing it into the surface irregularities of the components.

The advantages and benefits of the instant invention can best be appreciated by first understanding some of the defects inherent in prior art plastic seal constructions. Referring to FIGS. 1, 2, 3, and 4, there are shown successive stages of a prior art elastomer seal becoming destroyed to a point where zero leakage is impossible. For purposes of simplicity the views show only portions of a conventional conical-shaped metal poppet valve 10, a metal valve seat 12, and a plastic seal 14 constructed of Teflon or Kel-F or any other suitable fluoroethylene polymer. In FIG. 1 when valve 10 is moved toward seat 12, the peripheral section 15 of seal 14 protrudes beyond peripheral wall 11 of valve 10 by a distance ΔX. As shown in FIG. 2, after initial contact is made between seal 14 and seat 12 the distance ΔX diminishes. During this time seal 14 begins to deform and eventually a portion of it becomes a flattened extrusion 16 which extends into annular passageway 18 defined by peripheral wall 11 and seat 12.

Provided that there is adequate pressure on seal 14, zero leakage conditions can be achieved during the initial use of seal 14 and perhaps for a few additional uses but the pressure necessary to attain zero leakage conditions must be relatively high and therefore, as a consequence, extrusion 16 becomes increasingly flatter, thinner, and longer. Extrusion 16, due to the nonresilient nature of the plastic, is unable to return to its initial shape when pressure is relaxed and hence has been permanently deformed. Because of the inherent abrasive roughness of the metal surfaces of wall 11 and seat 12, extrusion 16 becomes lacerated and begins to tear. Referring to FIG. 3, which depicts the state of seal 14 after a few uses, extrusion 16 has been sheared away leaving peripheral section 15 approximately flush with the valve peripheral wall 11. At this time high-pressure fluid will be able to leak through small passageways existing between the metal to metal interface 19 between peripheral wall 11 and seat 12. The fluidtight seal has been permanently ruptured.

Referring to FIG. 4 leakage problems become even more severe when the valve structure is used in a cryogenic environment. In cryogenic temperatures the plastic such as Teflon or Kel-F experience a shrinkage of between 2 to 2½ percent relative to room temperature. Due to this shrinkage, peripheral section 25 automatically recedes inwardly of peripheral wall 11 to form a shallow recess. Fluid escape and leakage along interface 19 is then much facilitated. Ordinary erosion of seal 14 can now occur when valve 11 is seated or withdrawn from its seat.

One embodiment of the instant invention incorporating the concept of a plastic seal is shown in FIG. 5. A valve assembly or operator 30 has an actuator stem 32 of the plunger type that has an integrally formed enlarged base 34. Depending from and united with actuator base 34 is an annular actuator-follower or ram 39 with a base section 39'. Formed in the actuator base 34 is a socket 36 lying on the axis of stem 32. Cylindrical recess sections 37 and 38 are formed in actuator base 34. The valve assembly 30 also includes a conically shaped plug 40 having a drilled upstanding portion 42 inserted in socket 36. Plug 40 is assembled by positioning it in socket 36 and then extending a tie pin 55 through recess 37, portion 42 and recess 38. Tie pin 55 can be fixed in this position by threaded connection with the walls of recesses 37 and 37' or by any other appropriate securing means.

A ring 50 surrounds and is movable relative to plug 40 and actuator base 34. It is assembled in place after tie pin 55 has been inserted into its fixed position. A snap ring 56 is fixed in an annular recess of actuator stem 32 and another snap ring 57 is fixed in a groove on the inner periphery of ring 50. Between snap rings 56 and 57 there is a Belleville spring 58, the biasing force of which normally urges ring 50 in the downward direction. Another Belleville spring 59 is disposed in an annular space 59' formed between the bottom of actuator base 34 and plug 40. The biasing force of Belleville spring 59 normally urges plug 40 in a downward direction.

A seat 60 is conventionally retained between a pair of fluid conduit sections 65 and 66 which are connected together and are shown in phantom lines. A sealing surface 62 of the bevel seat type is formed on the upper portion of ring 60 to seat plug 40 and ring 50. When valve assembly 30 is raised from seat 60 fluid passes through conduit sections 65 and 66 along an S-shaped pathway as shown by the arrows. When raised from its seat, ring 50 is prevented from becoming disconnected from valve assembly 30 by snap ring 57. Snap ring 57 in this regard functions as a stop to limit the downward movement of ring 50. To assure zero leakage when the valve is closed a mass of plastic material 69 is used which preferably is a fluoroethylene polymer such as Teflon or Kel-F.

When valve assembly 30 is raised from seat 60, plastic 69 is retained in an annular chamber constituted by base section 39' of follower 39, an outer peripheral wall 46 of plug 40, and an inner peripheral wall section 51 of ring 50.

During sealing conditions, a captivating chamber exists at all times so that plastic 69 entirely fills and is confined by the captivating chamber. This chamber is defined by base section 39', wall section 46, wall section 51 and bevel seat 62 which is the sealing surface. The complete captivating chamber only exists and is only needed during sealing conditions.

Turning now to FIG. 6, plastic 69, shown in cross section, is captivated in its sealing position. The captivating chamber exactly defines the shape of plastic 69. By regulating the plunger force on actuator 32 the resulting pressure exerted by follower 39 on plastic 69 can be computed and adjusted to meet varying conditions. The pressure must be sufficient to cause plastic 69 to become viscous so that fluid in conduit 65 will be unable to leak beyond interface 68 between seat 62 and plastic 69. Plastic 69 being viscous and in a hydrostatic state will be compressed and squeezed into cracks, voids and the like formed in the rough metal-sealing surface of seat 62. Plastic 69 achieves perfect intimate conformity with the rough surface of seat 62 and therefore all passageways through which fluid might tend to escape are blocked. Fluid contained in conduit section 65 may succeed eventually in leaking along interface 67 between ring 50 and seat 62. However, all potential escape passageways will be blocked beyond the point where lip 52 of ring 50 makes metal-to-metal contact with bevel seat 62. Due to the highly viscous state of plastic 69 it is unable to become extruded in either direction along the surface of bevel seat 62. Force components resulting from the hydrostatic pressure of plastic 69 are utilized to contribute additional resistance to the tendency of plastic 69 to develop extrusions. High compressive force will bear against lip 52 causing it to make more intense metal-to-metal contact with seat 62. In a similar manner, force components bearing against shoulder 44 of plug 40 will produce a greater metal-to-metal contact between plug 40 and bevel seat 62. Thus while the surface voids of bevel seat 62 are completely filled with plastic 69, high compressive stress in plastic 69 is unable to produce extrusions due to the inherent high viscosity of the plastic material. A full description of this action is made with regard to FIG. 12.

It should be noted that when valve assembly 30 is being moved from its raised position to its seated position, actuator 32, ring 50, and plug 40 move as a unit without any relative movement between these parts. When ring 50 and plug 40 make initial metal-to-metal contact with bevel seat 62, plastic 69 is under no stress. Continued downward movement of the follower 39 of the actuator, by slipping through the annular space between ring 50 and plug 40, produces a direct force on plastic 69. As the biasing forces of Belleville springs 58 and 59 yield, pressure on plastic 69 is gradually increased. If provision was not made for gradual pressurization on plastic 69, then it would experience a tendency to develop extrusions as previously explained with regard to conventional seals. Thus substantial instantaneous pressure increase on plastic 69 from zero to its maximum compressive stress is avoided by the structure of the instant invention. After the biasing force in the Belleville springs is entirely overcome, pressure on plastic 69 can be constantly increased until the pressure requirements are satisfied. Thus, metal-to-metal contact between seat 62 and ring 50 and plug 40 is established before direct force is exerted on plastic 69.

To demonstrate the effectiveness of the captive plastic seal concept various experiments were conducted to evaluate the desired zero leakage sealing action. A modified 4 inch Annin Series 4,500 valve, constructed by the Annin Company, was used in testing a seal constructed of Teflon. The tested valve was very similar to the one shown in FIGS. 5 and 6. Under a variety of different environments, surface conformity between the seal and its bevel seat was achieved. The seal was found to be indestructible under ordinary modes of operation. It is well known that at room temperature or approximately +73° F., Teflon is relatively soft and ductile and has a compressive yield stress of approximately 1,800 p.s.i. By way of contrast Teflon in a cryogenic environment at approximately −423° F. loses much of its plasticity and behaves in many respects like metal because it becomes relatively hard and stiff and has a compressive yield stress of approximately 22,000 p.s.i. In addition, a mass of Teflon shrinks in size by about 2½percent as its temperature is reduced from room temperature to −423° F. Under conditions where the temperature was +73° F. and the fluid line pressure was 3,600 p.s.i., pressurizing the Teflon seal to between 1,500 and 2,000 p.s.i. was sufficient to fill voids in the seating surface of between 32 and 125 microinches in depth. Under conditions where the line pressure remained at 3,600 p.s.i. but the temperature was decreased to −320° F. a pressure on the Teflon seal of between 4,000 and 6,000 p.s.i. was required to fill voids in the seat of 32 microinches in depth. Under the same immediately preceding conditions where the voids were 125 microinches in depth, the Teflon seal had to be pressurized to between 9,000 and 11,000 p.s.i. in order to attain zero leakage conditions. The compressive yield stress of Teflon was never exceeded but in any event this would be an immaterial factor because, as mentioned, the plastic is totally confined and has no way of escaping. Although the plastic when chilled to −320° F. experienced approximately 2 percent shrinkage, the loss of mass volume was unable to impair the seal because the follower portion of the actuator simply descended an increment more to compensate for the loss. The seal maintained its integrity in achieving zero leakage conditions throughout the testing.

Figure 8:
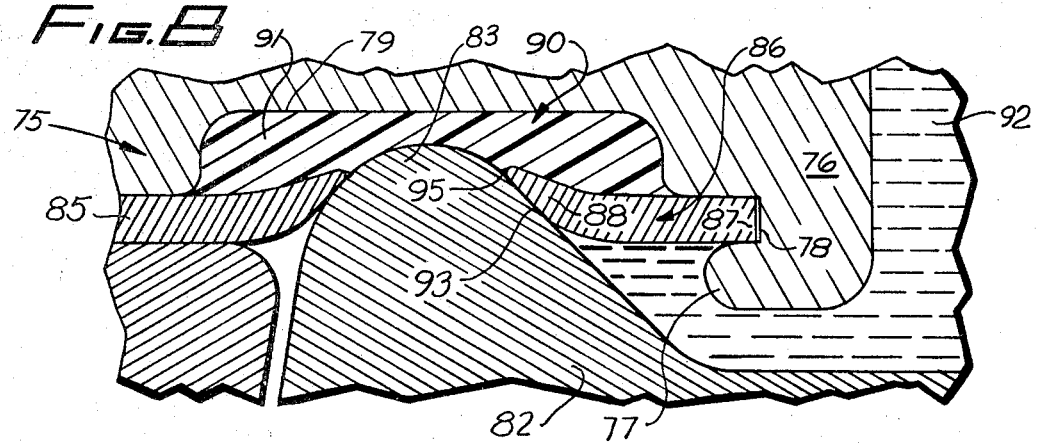
FIG. 8 is an enlarged view of a portion of the valve structure encircled by line 8 of FIG. 7.
Figure 7:
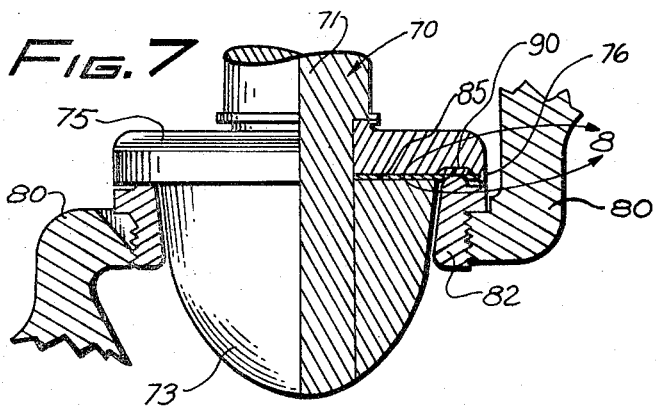
FIG. 7 is a partially cross-sectional view of the captive viscoelastic seal incorporated in an alternative embodiment of a poppet valve structure.

Another embodiment of a valve incorporating a dynamic captive seal is shown in FIGS. 7 and 8. The throttling or shutoff valve operator 70 includes an actuator stem 71 of the plunger type connected to a conical-shaped valve base 73. Connected to actuator stem 71 is an enlarged base 75 integrally formed on its outer edge with a retaining flange 76. As more specifically shown in FIG. 8 an inwardly extending rim 77 is formed on retaining flange 76 and cooperates with the body proper of actuator base 75 to define an annular groove 78. Inwardly of retaining flange 76 there is formed an annular recess 79. An insert plug 82, which serves as a valve seat, is connected in fluidtight relationship with a conduit section 80. Connected between actuator base 75 and valve base 73 is an actuator spring disc 85. In the same plane with disc 85 there is an annular actuator spring ring 86 which is snap fitted to groove 78 at its outer periphery 87. Inner periphery 88 of ring 86 rests against an annular lobe portion 83 of plug 82 whenever the valve is seated. Lobe 83 serves as the sealing surface for the seal construction.

A mass of plastic 90 such as Teflon is retained in the space defined by recess 79, disc 85 and ring 86. In achieving a zero leakage seal, plastic 90 totally fills and is captivated by packing chamber 91. The chamber 91 is defined by recess 79, disc 85, ring 86 and lobe 83. In operation, when valve 70 is raised from its seat 82, the stress in disc 85 and in ring 86 is relaxed so that they become flat. Plastic 90, since stress is also relieved in it, is transformed from a viscous state into a solid unitary mass and hence portions of it cannot become separated. When the valve construction is brought to its closed position, as shown in FIGS. 7 and 8, pressurization of plastic 90 proceeds gradually. When sealing surface lobe 83 makes initial metal-to-metal contact with disc 85 and ring 86, compressive stress in the plastic 90 is very slight. As actuator stem 71 descends, force is transmitted to disc 85 and ring 86 by lobe 83 causing them to bend and thereby compress plastic 90 by the necessary predetermined amount.

The plastic being sufficiently pressurized enters and fills the voids in the rough sealing surface of lobe 83. The hydrostatic pressure of plastic 90, necessary to effect a fluidtight condition depends primarily on the depth of the surface voids in lobe 83, the environmental temperature, and the fluid line pressure. Highly pressurized fluid 92, attempting to flow downwardly through insert plug 82 will ultimately succeed in leaking along interface 93 between lobe 83 and inner end 88 of ring 86. However, because there is perfect intimate conformity between plastic 90 and the surface roughness of lobe 83, fluid 92 will have no avenue of escape beyond point 95 and hence leakage will be terminated. Point 95 represents the line of intersection between lobe 83 and plastic 90. As previously indicated when valve 73 is lifted from its seat 83, plastic 90 loses its viscosity so that it can be readily retained and stored intact in the recess 91 for reuse.

The inventive principle underlying the captive plastic seal can also be used in static seals. In being exposed to a broad range of temperatures, between room temperature and cryogenic temperatures, for example, conventional plastic and elastomer sealing gaskets are incapable of maintaining zero leakage. This is due to the fact that when a conventional seal is being used in a coupling between a pair of conduit sections at room temperature and liquid hydrogen or the like, is passed through the coupling at −423° F., for example, the inner portions of the joint components contacted by the cryogenic fluid are rapidly chilled and forced to thermally contract. The outer portions of the joint components, including the bolt fasteners, thermally contract at a much slower rate. This temperature gradient results in the bolts being relatively longer, thereby allowing separation between the conduit sections which gives rise to leakage. Under these conditions a conventional gasket is no longer capable of recovering to attain zero leakage.

Another typical case of seal leakage at low temperature surface is the conventional O-ring in a groove or cavity between conduit sections. When the connection is cooled down cryogenically, the O-ring material, whether it be elastomer or plastic, shrinks about 2 percent from the dimension prior to the cooling. In this state the plastic material becomes hard and less ductile. This shrinking of the O-ring results in separation of the sealing surfaces and copious leakage. Flat plastic gaskets between conduit sections have similar characteristics and deficiencies. The instant invention eliminates these deficiencies.

There is shown in FIG. 9 an exploded view of a typical union-type seal structure, generally designated by numeral 109, for a static plastic captive seal according to the instant invention. The details of the seal structure will be described with reference to the drawing subsequent to FIG. 9. A pair of mated discs 110 and 112 form half sections for housing 109. Formed through the center of disc 110 is a passageway 114 and an internally threaded wall 115. Similarly formed through the center of disc 112 is a fluid passageway 116 and an internally threaded wall 117. An outer flange 128 of disc 110 is formed with a plurality of apertures 130 designed to register with apertures 131 formed in the outer flange of 127 of disc 112. Separating outer flange 128 from inner zone 129 is a seat 125 characterized by an annular groove. Seat 125 is contoured to receive the captive seal 126. Sealing gasket 126 is only schematically shown in FIG. 9 and its particular features and characteristics will be described with relation to subsequent FIGS. The captive seal 126 operates to obtain zero leakage when fluid at any temperature below approximately +500° F. and at any pressure is flowing through the static seal construction. A conduit section 118 has external threads to be screwed into internal threads 115 and an oppositely facing conduit section 120 has external threads to be screwed into internal threads 117. Thus the static seal structure can be used as a coupling between conduit sections 118 and 120. It should be noted that it is not restricted to use in conduits but can also serve as a seal for flanges on tanks, machines, valves, as previously indicated, and the like.

Prior to permitting fluid flow through conduit sections 118 and 120, mated discs 110 and 112 are tightened together and against seal 126 to accomplish the necessary sealing action. The degree of pressure on seal 126 for achieving fluidtight conditions varies and depends primarily, as previously mentioned, upon the temperature environment, the fluid line pressure, and the depth of the voids in the sealing surfaces into which the plastic must be pressed. When environmental conditions are determined, the seal structure is preloaded. This can be accomplished by screwing lock nuts 133 onto lock bolts 119 in an amount necessary to bring about the desired degree of tightening. Lock bolts 119 could be calibrated to show the degree of tightening. By adjusting lock nuts 133 on lock bolts 119 the degree of tightening can be adjusted to accommodate changing requirements. Alternatively, a hoop arrangement could be attached to the discs 110 and 112 to achieve adjustable tightening. One skilled in the art would known of numerous other arrangements by which the seal structure could be tightened.

Turning now to the important features of the seal structure itself, FIG. 10 shows a cross-sectional view of the static captive plastic seal when assembled but before the seal is compressed by tightening fasteners 119 and 133. This construction is generally referred to as seal structure 109. FIG. 11 depicts the details of the seal structure after discs 112 and 110 are tightened together. An endless, preferably cylindrical, imperforate inner spring 140 has three reverse bends characterized by a hook portion 144, another hook portion 146 and an intermediate bow portion 142. At the terminal portions of spring strip 140 are lips 145 and 147 which are in contact with discs 112 and 110, respectively. Strip 140 is constructed of any suitable spring metal such as work-hardened stainless steel of the 300 series. An outer endless cylindrical, imperforate spring strip 150 of general U-shape, has lips 151 and 152 at its terminal portions which are in contact with discs 112 and 110 respectively. Strip 150 can be constructed of the same metal used for strip 140 or in the alternative can be made of softer annealed metal, so long as the metal has sufficient resilience to be reusable.

A plastic material 126, having the properties as previously described with regard to the dynamic applications, is totally confined in and entirely fills an annular chamber 156. The outer dimensions of chamber 156 are defined by the surfaces of spring strips 140 and 150 and the opposing surfaces of discs 110 and 112. In this construction, discs 112 or 110 are both sealing surfaces for plastic 126. It should be noted that metal-to-metal contact between strips 150 and 140 and discs 110 and 112 is established prior to exerting force on plastic 126. Internal fluid pressure from a conduit as shown in FIG. 11 will be applied radially outward through chamber 157 defined by discs 110 and 112 and will come into contact with strip 140. However, due to the presence of the captive plastic seal 126, fluid 164 will be completely blocked from appreciably passing beyond lips 145 and 147. Plastic 126 is preferably pressurized well beyond its compressive yield point so that it is in a viscous state and behaves much like putty so that it will completely fill rough surface voids with which it is held in contact. It should be noted that in order to accommodate changing requirements, pressure on plastic seal 126 can be either further tightened or relaxed to satisfy changed conditions.

The sealing action between plastic 126 and discs 110 and 112 may be augmented by a fluid pressure assist which, as shown in FIG. 11, is contributed by fluid 164 collecting in the space defined by intermediate reverse bend or bow section 142. The force supplied by fluid 164 intensifies compression of plastic 126. In addition, the potential energy inherent in the spring material of strip 140 causes spring strip 140 to press against and further compact plastic 126. Phantom line 143 indicates where the outer surface of bow section 142 would be if chamber 156 was empty of plastic 126. Therefore, two forces, one from the spring action of strip 140 and the other from the pressure exerted by fluid 164 combine to compress plastic 126 against sealing surfaces or discs 110 and 112. This serves to attain a total surface conformity between plastic 126 and the metal surfaces with which it is in contact so that a positive seal is effected.

Perfect intimate conformity between plastic 126 and the sealing surfaces into which it is being pressed achieves the desired fluid-type sealing action. To illustrate this condition, FIG. 12 shows the interrelationship of the sealing, fluid and biasing forces which act near the juncture of lip 147 and disc 110. The surface of disc 110 is shown with highly magnified and exaggerated ridges 160 and valleys 161. Likewise lip 147 is shown with valley 162 and ridges 163. Liquid 164 of the fluid line will find and enter passageways 165 between the rough surfaces of disc 110 and lip 147. Eventually liquid 164 will weave through these passageways until it contacts plastic 126. Highly pressurized plastic 126 will entirely fill adjacent valleys 161. However, plastic 126 has a high viscosity and is unable to extrude into passageways 165 along the interface of lip 147 and disc 110. Thus the flow of fluid 164 is restained at the interface 167 between plastic 126 and fluid 164. It should be noted that theoretically, fluid 164 will push back plastic by a microscopic distance. Leaking cannot continue beyond interface 167.

By thus confining plastic 126 and forcing it in intimate conformity into the rough surface voids of disc 110, as well as lip 147, zero leakage is obtained. Prior art elastomer gaskets are unable to accomplish true zero leakage, at least over a significant life span because the plastic material eventually extrudes and becomes sheared off and in addition is gradually destroyed by erosion. Even under repetitive use, the embodiment of the captive plastic seal shown in FIGS. 10 and 11 maintains its integrity and cannot become ruptured. The effectiveness of the seal will last over a long period of time, even though the seal may be reused and frequently altered between positions depicted in FIG. 10 and FIG. 11.

Another embodiment of the instant invention incorporated in a static captive plastic seal using the same sealing principles is shown in FIG. 13. A gasket assembly 169 is shown with a pair of discs 170 and 172, similar to the discs 110 and 112 shown in FIGS. 11 and 12, are grooved to form annular sealant seats 171 and 173 respectively. A unitary normally cylindrical spring metal strip 175 of U-shaped cross section has a pair of arms 176 and 177. Arm 176 is disposed in seat 171 and arm 177 is disposed in seat 173. The seal is shown in its fully tightened position similar to FIG. 11. Lip portions 180 and 181 of arms 176 and 177, respectively, are in metal-to-metal contact with seats 171 and 173. Two slugs of plastic material 184 and 185 are confined in separate chambers 186 and 187, respectively. Chamber 186 is the space defined by arm 176 and seat 171 and similarly chamber 187 is the space defined by arm 177 and seat 173. Gasket assembly 169 can be relaxed or even disassembled by expanding the clearance between discs 170 and 172.

Hydrostatic pressure of plastic material 184 and 185 is intensified by spring energy in arms 176 and 177 which, if the plastic material was removed, would be urged outwardly to positions as shown in phantom lines 178 and 179, respectively. Pressurized fluid passes through passageway 190 located between discs 170 and 172 and enters a central pocket 191. The fluid in central pocket 191 exerts a fluid line assist in compressing plastic material 184 and 185. A continuous spacer ring 195 engages at its opposite ends 196 and 197, lip portions 180 and 181, respectively. An aperture 199 is formed in ring 195 to admit fluid. By partially restaining relative inward movement of lips 180 and 181, by spacer ring 195, greater compression on the plastic masses is achieved. Arms 176 and 177 become bowed and the resulting spring action is used to compress the plastic.

Fluid will escape through passageways formed in the rough surfaces, in metal-to-metal contact, between lips 180 and 181 with their seats 171 and 173. However, the plastic material will be pressed in intimate conformity into the voids of the adjacent rough metal surfaces. The sealing action at these points is similar to the sealing action as described with reference to FIGS. 10, 11, and 12. Fluid will be unable to pass beyond the fluid plastic interfaces for the same reasons as set forth in the description of FIG. 12.

It should be understood that the principle underlying the captive plastic seal has road application to the structures other than those specifically described. For example, various fluid line or nonfluid line couplings, joints, connectors, fittings and the like could be improved by making use of the instant invention.

The instant invention has been described in terms of utilizing a seal constructed preferably of a fluoroethylene polymer such as Teflon or Kel-F because this type of material has superior properties when the seal is to be used in cryogenic environments. It should be noted, however, that this material is also suitable for use well above cryogenic temperatures to approximately +500° F. for example. This invention is by no means restricted to a seal for use in cryogenic environments. When the seal is to be used in noncryogenic environments any material can be used which is readily deformable and extrudable and has a property of high viscosity such that it is incapable of flowing without sufficient pressure. Materials which could be used under these conditions are numerous, some of which are polyethylene, polypropylene, polyvinyl chloride, polyvinylidene chloride and vinylidene fluoride.

Although the invention has been described in detail in preferred embodiments, it will be obvious to those skilled in the art that after understanding the invention, various changes and modifications can be made therein without departing from the spirit and the scope of the appended claims;

I claim:

1. A seal construction comprising:
a viscoelastic mass;
resilient wall means for containing said mass in a defined volume, said containing means including edge means defining a peripheral gap additionally exposing at least one peripheral surface of said viscoelastic mass for sealing purposes, the remainder of said containing means being in intimate contact along all of the remaining peripheral surface of said mass; and
whereby when said seal construction is disposed adjacent at least one sealing surface to be sealed, said sealing surface forms with said containing means a now completely enclosed volume for said viscoelastic material, said edge means are in contact with the surface to be sealed and upon the application of external pressure to said viscoelastic mass, said viscoelastic mass comes in intimate sealing contact with said surface to be sealed and said resilient wall means are deformed retaining at least a part of its resilience.

2. The structure according to claim 1 wherein:
said containing means includes a first curved imperforate resilient strip and a second curved imperforate resilient strip, each of strips having the same height and terminating in outer peripheral lips forming said edge means, said strips being spaced from one another so that said mass has two exposed surfaces extending across and bridging the space between said lips, said exposed surfaces extending parallel to each other and spaced apart a distance equal to the height of said strips; and
there are two surfaces to be sealed, said sealing surfaces being arranged to be brought into intimate sealing contact with said exposed surfaces.

3. The structures according to claim 2 wherein said strips are continuous and spaced radially from one another.

4. The structure according to claim 1 wherein said viscoelastic mass is a fluoropolymer.

5. The structure according to claim 1 wherein said containing means include a movable ram member for exerting pressure on said viscoelastic mass.

6. The structure according to claim 1 wherein said resilient wall means includes a deformable spring member for exerting pressure on said viscoelastic mass.

7. A seal construction comprising:
a first surface to be sealed;
a second surface to be sealed;
said surfaces being arranged adjacent one another;
a first endless spring strip with one edge positioned on said first surface and its other edge in engagement with said second surface;
a second endless spring strip with one edge on said first surface and its other edge in engagement with said second surface, said first and second strips being radially displaced from one another to form a peripheral gap;
a chamber defined by said surfaces and said strips;
a plastic mass captivated in said chamber, said mass being in intimate contact with the inner peripheral facing surfaces of each of said strips and forming an exposed surface in said gap parallel to said first and second surfaces and confined by said strip edges, said mass thus entirely filling said chamber; and
means including both of said strips for applying force directly on said plastic mass sufficient to make said plastic mass viscous so that it can be pressed, in intimate conformity, into surface voids and irregularities in the surfaces defining said chamber.

8. The structure according to claim 7 wherein said first strip has a cross section with plural reverse bends between its edges, said first strip including an intermediate reverse bend which projects into said chamber so that its potential energy can be used to augment compression of said plastic mass.

9. The structure according to claim 7 further comprising means for selectively tightening the seal by adjusting the distance between said surfaces.

10. A seal construction comprising:
a first surface to be sealed including means forming a first seating groove;
a second surface to be sealed including means forming a second seating groove, said surfaces being arranged adjacent one another with their respective seating grooves in facing relationship;
an endless spring strip having a pair of integrally formed diverging arms, a first arm of which is positioned in said first seating groove and a second arm of which is positioned in said second seating groove;
means for connecting the surfaces together;
a pair of chambers, one chamber being formed by the walls of said first seating groove and said first arm, the other chamber being formed by the walls of said second seating groove and said second arm;
a plastic material placed in and captivated by each of said chambers, said plastic entirely filling its respective chamber; and
means for applying force directly on said plastic material sufficient to make said plastic material viscous so that it can be pressed, in intimate conformity, into surface voids and irregularities of the walls of said chambers.

11. The structure according to claim 10 further comprising a spacer ring extending between and engaging said arms to stop relative inward movement of said arms with the result that compression stress on said plastic material is increased.

12. A seal comprising a first endless resilient spring strip;
a second endless resilient spring strip spaced from said first strip;
each of said strips having the same height and terminating in outer peripheral lips forming spaced surface-contacting edge means with peripheral gaps therebetween;
a chamber defined by said strips;
a plastic mass captivated in said chamber, said mass being in intimate contact with inner peripheral facing surfaces of said strips and forming exposed surfaces in said gaps parallel to and bridging said lips, said exposed surfaces being spaced apart a distance equal to the height of said strips, said mass entirely filling said chamber; and
said strips being compressible whereby said mass becomes viscous and presses the exposed surfaces of the mass into voids and irregularities of surfaces to be sealed.